(12) United States Patent
Hine et al.

(10) Patent No.: US 9,728,784 B2
(45) Date of Patent: Aug. 8, 2017

(54) CARBON MATERIAL FOR POWER STORAGE DEVICE ELECTRODE, METHOD OF PRODUCING THE SAME AND POWER STORAGE DEVICE USING THE SAME

(71) Applicant: Panasonic Intellectual Property Management Co., Ltd., Osaka (JP)

(72) Inventors: Kiyohiro Hine, Osaka (JP); Naomi Nishiki, Kyoto (JP); Akira Kano, Osaka (JP); Masahisa Fujimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 451 days.

(21) Appl. No.: 14/569,304

(22) Filed: Dec. 12, 2014

(65) Prior Publication Data

US 2015/0180035 A1    Jun. 25, 2015

(30) Foreign Application Priority Data

Dec. 25, 2013    (JP) .................................. 2013-266802

(51) Int. Cl.
| | |
|---|---|
| *H01M 4/88* | (2006.01) |
| *H01M 4/587* | (2010.01) |
| *C01B 31/04* | (2006.01) |
| *H01M 10/054* | (2010.01) |
| *H01M 4/02* | (2006.01) |

(52) U.S. Cl.
CPC ............. *H01M 4/587* (2013.01); *C01B 31/04* (2013.01); *H01M 10/054* (2013.01); *H01M 2004/021* (2013.01)

(58) Field of Classification Search
CPC ............ H01M 4/587; H01M 6/04; B32B 3/12
USPC ............. 252/182.1; 429/188, 231.8; 156/197
See application file for complete search history.

(56) References Cited

U.S. PATENT DOCUMENTS

| | | | | |
|---|---|---|---|---|
| 4,921,744 A | * | 5/1990 | Mitsui | B32B 3/12 |
| | | | | 156/197 |
| 6,652,958 B2 | * | 11/2003 | Tobita | C08K 9/02 |
| | | | | 257/E23.107 |
| 2010/0261051 A1 | | 10/2010 | Okada et al. | |
| 2012/0328956 A1 | * | 12/2012 | Oguni | H01M 4/625 |
| | | | | 429/232 |

FOREIGN PATENT DOCUMENTS

| | | |
|---|---|---|
| JP | 2001-080914 A | 3/2001 |
| JP | 2006-131452 | 5/2006 |
| JP | 2009-129741 | 6/2009 |
| JP | 2010-275116 | * 12/2010 ............. C01B 31/02 |

* cited by examiner

*Primary Examiner* — Khanh Tuan Nguyen
(74) *Attorney, Agent, or Firm* — Panasonic IP Management; Kerry S. Culpepper

(57) ABSTRACT

A method for producing a vitreous carbon material which can serve as a carbon material for a power storage device. In the method, a polymer material, having six-membered ring structures in its basic carbon skeleton and having a nitrogen atom, is heated at a temperature of 1000° C. to 2100° C. under an inert gas environment, and then, the polymer material is pulverized, to thereby control graphitization and crystal growth of the carbon material, thus producing a vitreous carbon material which serves as a carbon material for a power storage device.

10 Claims, 1 Drawing Sheet

CARBON MATERIAL FOR POWER STORAGE DEVICE ELECTRODE, METHOD OF PRODUCING THE SAME AND POWER STORAGE DEVICE USING THE SAME

BACKGROUND

1. Technical Field

The technical field relates to a carbon material for a power storage device. More particularly, the technical field relates to a carbon material for a power storage device electrode which is used as an electrode active material such as for a sodium-ion rechargeable battery.

2. Description of Related Art

In recent years, power storage devices have been used in, for example, mobile apparatuses such as mobile phones, and electric cars. In addition, clean energies such as photovoltaic power generation have been increasing sought. As a result, large-scale power storage facilities are required for stabilization of electric power production and supply, and demand for power storage devices is continuously expanding.

For these purposes, large-capacity power storage devices are required, and lithium-ion rechargeable batteries have actively been developed.

Meanwhile, rare metals such as lithium, nickel and cobalt are used as cathode materials in lithium-ion rechargeable batteries. However, rare metals are limited resources. Therefore, in recent years, development of sodium-ion rechargeable batteries which do not include rare metals in cathode materials has been studied.

However, since the ion radius of sodium ions is larger than that of lithium ions, sodium-ion rechargeable batteries cannot obtain sufficient properties if they have the same constitution as that of lithium-ion rechargeable batteries. Therefore, components suitable for sodium-ion rechargeable batteries have been developed.

Among them, anode materials are one of important components which determine charge/discharge properties of batteries. As a conventional carbon material for a power storage device, a vitreous carbon material which exhibits superior charge/discharge properties can be mentioned (for example, see JP-A-2009-129741).

In addition, as a conventional method of producing such vitreous carbon material, a method in which thermosetting resin fibers are subjected to a heating carbonization treatment and an activation treatment, and are then pulverized, can be mentioned (for example, see JP-A-2006-131452).

SUMMARY

However, according to the above-described conventional arts, a uniform activation treatment based on complicated condition control is required in order to obtain a high-quality vitreous carbon material.

Consequently, the conventional arts have the drawback of requiring materials and production methods for purposes in which large-scale production is required in order to obtain a carbon material for a power storage device electrode.

In view of the above-described problem associated with conventional arts, as well as other concerns, a method of producing a carbon material for a power storage device electrode which can produce a carbon material by only simple steps of heating and pulverization, as well as the carbon material is described herein.

A carbon material for a power storage device includes a carbon material having six-membered ring structures in its basic carbon skeleton and having a nitrogen atom, and an interlayer distance between the six-membered ring structures is 3.44 to 3.73 Å.

A method of producing a carbon material for a power storage device, includes: heating a polymer material having six-membered ring structures in its basic carbon skeleton and having a nitrogen atom at a maximum temperature of 1000° C. to 2100° C. under an inert gas environment; and then pulverizing the polymer material to produce the carbon material.

Furthermore, a power storage device includes, as an electrode, the above-described carbon material for a power storage device, or a carbon material for a power storage device produced by the above-described method.

As described above, when the carbon material for a power storage device electrode is used for a sodium-ion rechargeable battery, a sodium-ion rechargeable battery having excellent properties can be realized. Furthermore, according to the method of producing a carbon material for a power storage device electrode described herein, a vitreous carbon material for an electrode which realizes excellent properties of a sodium-ion rechargeable battery can be produced by only simple steps of heating and pulverization.

The method of producing a carbon material for a power storage device electrode can provide a power storage device, particularly a sodium-ion rechargeable battery, which has excellent charge/discharge properties, and can be included in stationary power storage apparatuses and rechargeable batteries for mobile apparatuses.

DESCRIPTION OF EMBODIMENTS

Figure 1:
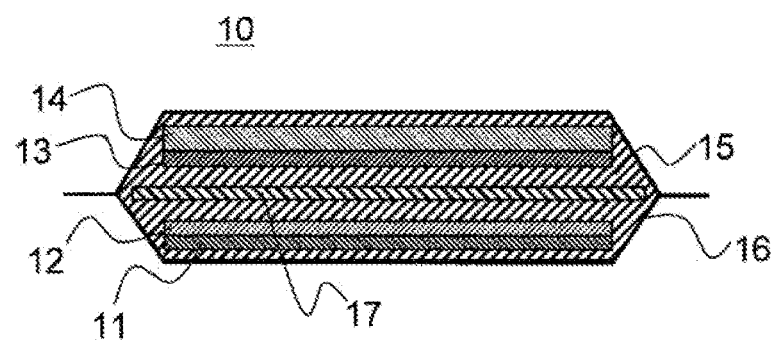
FIG. 1 shows an evaluation cell of a carbon material for a power storage device electrode according to an embodiment.

Hereinafter, exemplary embodiments will be described with reference to figures.

Embodiment

In a method of producing a carbon material for a power storage device electrode according to the embodiment, a polymer material having six-membered ring structures in its basic carbon skeleton and having a nitrogen atom is used as a starting material.

Because the polymer material has six-membered ring structures in its basic carbon skeleton, carbon bonds in the six-membered ring structures are not broken during heating. Therefore, when atoms other than carbon are eliminated therefrom, the polymer material forms into a graphite carbon material in which the six-membered ring structures are arrayed in a planar fashion.

Furthermore, a nitrogen atom has a property that it is eliminated therefrom at a higher temperature, compared with other components such as oxygen or hydrogen, and therefore, remains even after heating. Therefore, when the six-membered ring structures are arrayed in a planar fashion, the nitrogen atom interferes with the ordered array. Consequently, the size of crystals where six-membered rings are arrayed can be made small, and properties of a vitreous carbon material can be developed.

Such a polymer material includes an aromatic polyimide, a polyamide-imide, a polyamide, a polyoxadiazole, a polybenzimidazole, and the like.

Among them, an aromatic polyimide is particularly preferably used in the method of producing a carbon material for a power storage device electrode according to the embodiment.

Since aromatic polyimide materials have an imide group in its structure, they have a nitrogen atom and six-membered ring structures. Therefore, aromatic polyimide materials satisfy properties required for the starting material used in the method of producing a carbon material for a power storage device according to an embodiment.

Moreover, the method of producing a carbon material for a power storage device electrode according to the embodiment has a step of heating the polymer material at a temperature of 1000° C. to 2100° C. under an inert gas environment. By heating the polymer material under an inert gas environment, the atmosphere gas is prevented from binding to carbon atoms in the polymer material, and a graphite carbon material can be produced.

The heating temperature is preferably 1000° C. to 2100° C. When the heating temperature is below 1000° C., elimination of oxygen atoms and hydrogen atoms other than nitrogen atoms included in the polymer material will be insufficient, and formation of six-membered ring structures will be insufficient.

Furthermore, when the polymer material is heated above 2100° C., a layered structure in which planes of six-membered ring structures are layered will be developed, and crystallization will proceed. Therefore, properties of a vitreous carbon material cannot be developed in any cases.

In addition, in the method of producing a carbon material for a power storage device electrode according to an embodiment, the carbon material is particularly preferably produced by heating the polymer material at a temperature of 1000° C. to 1600° C. under an inert gas environment. By heating the polymer material at 1000° C. to 1600° C., a size of crystals in which six-membered rings are arrayed can be kept small because nitrogen atoms remains therein.

EXAMPLES

<Method of Producing a Carbon Material>

In Examples, in order to examine differences among properties of carbon materials, as carbon materials for a power storage device electrode, depending on differences of heating temperatures, carbon materials of the following conditions were produced.

As a starting material for the examples, an aromatic polyimide sheet material 25 μm thick was prepared. At first, 1 kg of the sheet material was weighed, and was charged to a carbon melting pot. Then, the melting pot, which the sheet material had been charged to, was placed in an electric furnace to be heated, and the air inside the electric furnace was replaced with nitrogen gas.

After replacement with nitrogen gas, the sheet material was heated at a temperature rising rate of 100° C./h, and was maintained at a maximum temperature for one hour. Then, the sheet material was cooled to room temperature by natural cooling. In addition, for heating of the sheet material, the sheet material was heated while flowing nitrogen gas therein.

In examples, carbon materials obtained by varying the maximum temperature (during heating them) from 300° C. to 2500° C. were prepared, and evaluation of physical properties of carbon materials and evaluation of electrode properties described below were carried out.

<Evaluation of Physical Properties of Carbon Materials>

For evaluation of physical properties of carbon materials, X-ray diffraction (XRD) was carried out. By the 2θ-θ method of XRD, a plane space d (interlayer distance) of (002) planes of graphite was determined from the angle θ. The size of crystallites in the C-axis direction was determined from a half-value width of a peak of (002) planes.

A degree of vitreosity (vitreous carbon) can be interpreted from the size of crystallites. When the size of crystallites is large, crystallization (graphitization) has progressed. When the size is small, the degree of vitreous carbon is large.

When the interlayer distance is small, the degree of graphitization is large. When the interlayer distance is large, the degree of vitreous carbon is large.

Furthermore, in order to clarify contents of elements included in samples, atoms of N and O were measured by the X-Ray Photoelectron Spectroscopy (XPS).

Properties of carbon materials are shown in Table 1. Measurement results of XRD and XPS of carbon materials obtained by varying the maximum temperature in the heating treatment between 800° C. and 2500° C. are shown therein.

TABLE 1

| | Samples | Comparative Example 1 | Example 1 | Example 2 | Example 3 | Example 4 | Example 5 | Comparative Example 2 |
|---|---|---|---|---|---|---|---|---|
| Properties of carbon materials | Maximum temperature in the heating treatment (° C.) | 800 | 1000 | 1400 | 1600 | 1800 | 2100 | 2400 |
| | Interlayer distance d (Å) | 3.85 | 3.73 | 3.63 | 3.55 | 3.51 | 3.44 | 3.37 |
| | Crystallite size L | <15 | <15 | <15 | 20 | 25 | 44 | 862 |
| | Elements N (at %) | 8.3 | 4.1 | 2.5 | 1.8 | 1.2 | ≤1 | ≤1 |
| | O | 7.0 | 3.1 | ≤1 | ≤1 | ≤1 | ≤1 | ≤1 |
| Properties of batteries using the above-described carbon materials | Initial discharge capacities (mAh/g) | 49 | 240 | 230 | 218 | 168 | 109 | 22 |
| | Initial charge/discharge efficiencies (%) | 21 | 85 | 89 | 89 | 82 | 72 | 17 |
| | Determination | Unacceptable | Acceptable | Acceptable | Acceptable | Acceptable | Acceptable | Unacceptable |

As shown in Table 1, the interlayer distance d in Comparative Example 1 of a maximum temperature of 800° C. was as large as 3.85 Å. As the maximum temperature increased, the interlayer distanced became smaller. In Comparative Example 2 of a maximum temperature of 2400° C., the interlayer distance d was 3.37 Å, and approached 3.364 that is a value for an interlayer distance d of graphite.

Based on results of N and O quantities according to XPS, when the maximum temperature was made high, impurities such as N and O included in aromatic polyimides were less. O was 1% or less at 1400° C., while N was 1% or less at 2100° C.

Based on the results, it is considered that, when the maximum temperature was low, carbon bonding did not sufficiently proceed, carbonization was insufficient, and the interlayer distance d was large.

Furthermore, when the maximum temperature was low, the crystallite diameter L became small, and it was confirmed that the carbon materials had a vitreous state where crystallization had not advanced. The crystallite diameter L gradually became large from the sample in Example 3 of 1600° C., and, in the sample of Comparative Example 2, the crystallite diameter reached 862 Å, and thus, rapidly became large.

It is considered that this is because impurities such as N and O hardly remained when the maximum temperature was high, and therefore, rearrangement of carbon atoms proceeded, and crystallization rapidly progressed.

<Production of Evaluation Cells 10>

Carbon materials of Examples and Comparative Examples produced by the above-described method were used as anode active materials to produce evaluation cells 10 shown in FIG. 1, and the produced cells were evaluated as sodium-ion rechargeable batteries.

FIG. 1 is a cross-sectional view of an evaluation cell 10 of a carbon material for a power storage device electrode according to the embodiment. The evaluation cell 10 includes an anode collector electrode 11 made with a copper foil, an anode active material 12 made with a slurry including a carbon material, a counter electrode 13 made with a sodium metal which supplies sodium ions, a cathode collector electrode 14 which is a nickel mesh, an electrolyte solution 15, an exterior 16 which protects a battery, and a separator 17 which prevents a short circuit.

Each of carbon materials of Comparative Examples 1 to 2 and Examples 1 to 5 in above Table 1 as an anode active material 12, and polyvinylidene fluoride as a binder were weighed at a weight ratio of 9:1, and a slurry of them dispersed in a solvent of N-methylpyrrolidon (MNP) was obtained. As the carbon material, that obtained by pulverizing the material at a particle diameter of 50 μm with a mortar was used.

The obtained anode active material 12 was coated onto the anode collector electrode 11 with a coating machine. The coated anode collector electrode 11 was rolled with a rolling machine, the resulting anode collector electrode was punched to form a 20-mm square, and this was processed into an electrode state, thereby obtaining each of test electrodes of examples and comparative examples. Then, these test electrodes were used to produce sodium-ion rechargeable batteries (evaluation cell 10) in which a sodium metal was used as a counter electrode 13.

Preparation of the electrolyte solution 15 and production of the evaluation cell 10 were carried out inside a glove box at a dew point of −60° C. or less and of an Ar atmosphere of an oxygen level of 1 ppm. For the electrolyte solution 15, a material obtained by dissolving 1 mol of sodium phosphate hexafluoride ($NaPF_6$) in a solvent which was obtained by mixing ethylene carbonate and diethyl carbonate at a volume ratio of 1:1 was used.

In addition, a sodium metal for the counter electrode 13 was crimped to the nickel mesh 4 of a 20-mm square to produce the counter electrode.

Each of the above-described test electrodes and the counter electrode were installed inside the exterior 16 in a state where they face one another through the separator 17 of a polyethylene microporous membrane impregnated with the electrolyte solution 15, and the opening of the exterior 16 was sealed, thereby obtaining the evaluation cell 10.

<Method for Evaluation on Evaluation Cells>

A charge/discharge test was carried out with respect to the above-described evaluation cells 10, and their initial charge/discharge efficiencies were evaluated. The method is described below. The charge/discharge test of evaluation cells 10 was carried out inside a thermostat chamber at 25° C. For the charge/discharge test, a test in which the test electrode including the anode active material 12 was charged, and, after pausing the charge for 20 minutes, discharge was conducted, was carried out.

Charge and discharge were carried out at a constant current with a current value of 0.05 mA per unit area of the anode collector electrode 11. In addition, charge was terminated at a point when the voltage reached 0 V (charge termination voltage: 0 V). Discharge was terminated at a point when the voltage reached 2.0 V (discharge termination voltage: 2.0 V).

An initial discharge capacity (mAh/g) and an initial charge capacity (mAh/g) were each obtained as values obtained through division by the weight of the anode active material 12. Additionally, a value obtained by dividing the initial discharge capacity by the initial charge capacity was calculated as an initial charge/discharge efficiency (%). Measurement results of initial charge/discharge efficiencies are shown in a section of battery properties of Table 1. The initial discharge capacities are also shown therein.

It is required that the initial charge/discharge efficiency is 70% or more, such that the storage battery can repeatedly and stably be used. Therefore, when the initial charge/discharge efficiency was 70% or more, the evaluation cell was determined as acceptable. Also, since the initial discharge capacity decreases by repeated use, the evaluation cell was determined as acceptable when the initial discharge capacity was 100 mAh/g or more.

As to the evaluation cell 10 using Comparative Example 1, both the discharge capacity and the efficiency were low, while, in evaluation cells 10 each using Examples 1 to 5, favorable charge/discharge properties were obtained. However, in evaluation cells 10 of Examples 5 and 6 where the maximum temperature was further increased, their discharge capacities and efficiencies were lowered with the increase of the test temperature.

<Summary>

From these results (Table 1), it was confirmed that, based on a method of producing a carbon material for a power storage device electrode according to the embodiment, a vitreous carbon material for an electrode which realizes excellent properties of a sodium-ion rechargeable battery can be produced by only simple steps of heating and pulverization.

Based on the results of the embodiment, it was revealed that, by using a vitreous carbon material in which carbonization proceeds but in which crystallization does not proceed, excellent properties of a sodium-ion rechargeable battery can be developed.

Progress of carbonization is shown by a value of an interlayer distance d of (002) planes of graphite, and it is preferable that impurity elements are less. Based on Table 1, it was revealed that a carbon material which was carbonized such that the interlayer distance d was 3.44 Å to 3.73 Å, that the impurity element O was 3.1 at % or less, and that N was 4.1 at % or less.

In addition, as a degree of vitreosity, a value of the crystallite diameter Lc is preferably small. It can be understood that the value of the crystallite diameter Lc increases with progress of graphitization.

Based on these results, the following conditions were preferred to produce a carbon material developing the effects of the embodiment by only simple steps of heating and pulverization.

Figure 2:
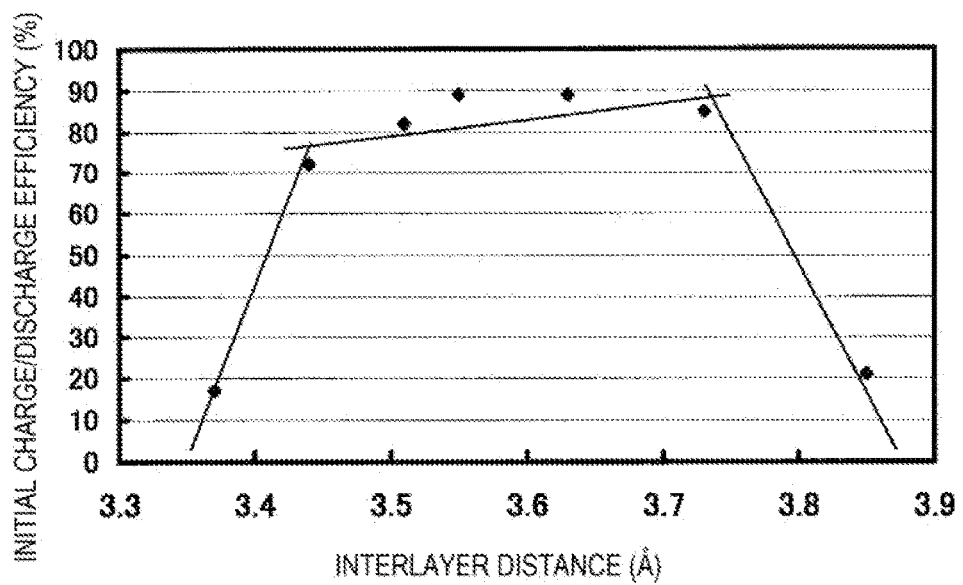
FIG. 2 shows a relation between an interlayer distance and an initial charge/discharge efficiency of an evaluation cell according to an embodiment.

A relation between the interlayer distance d and the initial charge/discharge efficiency is shown in FIG. 2. The vertical axis refers to the initial charge/discharge efficiency, and the horizontal axis refers to the interlayer distance. As seen from FIG. 2, discontinuous changes are observed in the above-mentioned range and other ranges. Consequently, it is understood that the interlayer distance d is preferably 3.44 Å to 3.73 Å.

The size of the crystallite diameter Lc is favorably 15 Å to 45 Å. As to the quantity of N, at least 1.0 at % or more is sufficient, and it is required that the quantity of N is 4.1 at or less. As to the quantity of O, at least 1.0 at % or more is sufficient, and it is required that the quantity of O is 3.1 at % or less.

This phenomenon is considered in the following way. When the crystallite diameter is large, there are a few interfaces where crystal planes are disturbed because every single crystal is large. Therefore, absorption/elimination of sodium ions hardly occur. Consequently, the charge/discharge efficiency is inferior. When the interlayer distance d is large, this results in a state where the material does not turn into carbon (organic-like state), and the charge/discharge efficiency is inferior. The interlayer distance particularly sensitively influences the properties. It is considered that this is because of a planar state of layers, i.e. because planes bring about effects on the properties.

In addition, the film thickness was made 25 μm in the embodiment. However, embodiments are not limited to the thickness, and it has been confirmed that, for example, even with a film of a large thickness such as 50 μm or 125 μm, the same effects can be developed.

Also, although sodium-ion rechargeable batteries were produced by the specific method in the embodiment, the invention is not limited to the specific method. For example, even when types of binders and electrolyte solutions are different, effects can be developed as a carbon material for a sodium-ion rechargeable battery electrode.

What is claimed is:

1. A carbon material for a power storage device, comprising a carbon material having six-membered ring structures in its basic carbon skeleton and having a nitrogen atom, wherein an interlayer distance between the six-membered ring structures is 3.44 to 3.73 Å, wherein the carbon material is made from sheet material.

2. The carbon material for a power storage device according to claim 1, wherein a crystallite size is 44 Å or less and 15 Å or larger.

3. The carbon material for a power storage device according to claim 1, wherein a quantity of oxygen is 1.0 at % to 3.1 at %.

4. The carbon material for a power storage device according to claim 1, wherein a quantity of nitrogen is 1.0 at % to 4.1 at %.

5. A power storage device, comprising, as an electrode, the carbon material for a power storage device according to claim 1.

6. A method of producing a carbon material for a power storage device, comprising:
heating a polymer sheet material, having six-membered ring structures in its basic carbon skeleton and having a nitrogen atom, at a maximum temperature within a range of 1000° C. to 2100° C. under an inert gas environment; and
then pulverizing the polymer material to produce the carbon material,
wherein, the polymer sheet material consisting essentially of at least one of an aromatic polyimide, a polyamide-imide, a polyamide, a polyoxadiazole, and a polybenzimidazole.

7. The method of producing a carbon material for a power storage device according to claim 6, wherein the polymer material is heated at a maximum temperature within a range of 1000° C. to 1600° C. under an inert gas environment.

8. The method of producing a carbon material for a power storage device according to claim 6, wherein the polymer sheet material is an aromatic polyimide.

9. A power storage device, comprising, as an electrode, the carbon material for a power storage device produced by the method of producing a carbon material of claim 6.

10. The method of producing a carbon material for a power storage device according to claim 6, wherein the polymer sheet material includes only polyimide.

* * * * *